United States Patent
Tang

(10) Patent No.: US 9,215,233 B2
(45) Date of Patent: Dec. 15, 2015

(54) SERVER CAPABLE OF AUTHENTICATING IDENTITY AND IDENTITY AUTHENTICATION METHOD THEREOF

(71) Applicant: HON HAI PRECISION INDUSTRY CO., LTD., New Taipei (TW)

(72) Inventor: Chiang-Chung Tang, New Taipei (TW)

(73) Assignees: Patentcloud Corporation, Shenzhen (CN); Patentcloud Co. Limited, Kwun Tong (HK)

( * ) Notice: Subject to any disclaimer, the term of this patent is extended or adjusted under 35 U.S.C. 154(b) by 238 days.

(21) Appl. No.: 14/064,209

(22) Filed: Oct. 28, 2013

(65) Prior Publication Data

US 2015/0095996 A1    Apr. 2, 2015

(30) Foreign Application Priority Data

Sep. 30, 2013  (TW) .............................. 102135444 A

(51) Int. Cl.
  *H04L 29/06* (2006.01)
  *G06K 9/00* (2006.01)
  *G06F 21/32* (2013.01)

(52) U.S. Cl.
  CPC ............ *H04L 63/0861* (2013.01); *G06F 21/32* (2013.01); *G06K 9/00288* (2013.01); *G06K 9/00302* (2013.01)

(58) Field of Classification Search
  CPC ... G06F 21/31; H04L 63/0861; H04L 63/083; H04L 63/08; H04L 63/102; H04L 63/0815; G06K 9/00288; G06K 9/00302
  USPC .......................................................... 726/6
  See application file for complete search history.

(56) References Cited

U.S. PATENT DOCUMENTS

| | | | | |
|---|---|---|---|---|
| 6,092,192 A * | 7/2000 | Kanevsky et al. | ............ | 713/186 |
| 7,231,657 B2 * | 6/2007 | Honarvar et al. | ................. | 726/2 |
| 7,436,988 B2 * | 10/2008 | Zhang et al. | .................. | 382/118 |
| 8,572,398 B1 * | 10/2013 | Duncan | ......................... | 713/186 |
| 2005/0091338 A1 * | 4/2005 | de la Huerga | ................. | 709/217 |
| 2009/0091420 A1 * | 4/2009 | Dobashi | ......................... | 340/5.2 |
| 2009/0177939 A1 * | 7/2009 | Chabanne | ..................... | 714/752 |
| 2012/0019379 A1 * | 1/2012 | Ben Ayed | .................. | 340/539.1 |
| 2012/0249524 A1 * | 10/2012 | Yokote | .......................... | 345/419 |
| 2013/0083052 A1 * | 4/2013 | Dahlkvist et al. | ............. | 345/619 |
| 2013/0227651 A1 * | 8/2013 | Schultz et al. | ..................... | 726/4 |
| 2013/0267204 A1 * | 10/2013 | Schultz et al. | ................ | 455/411 |
| 2014/0237567 A1 * | 8/2014 | Furlong et al. | .................... | 726/6 |
| 2015/0032473 A1 * | 1/2015 | Sadrieh | ............................ | 705/3 |
| 2015/0095996 A1 * | 4/2015 | Tang | ................................ | 726/6 |

\* cited by examiner

*Primary Examiner* — Farid Homayounmehr
*Assistant Examiner* — Sanchit Sarker
(74) *Attorney, Agent, or Firm* — Novak Druce Connolly Bove + Quigg LLP

(57) ABSTRACT

An identity authentication method is applied in a server which stores a relationship among a number of facial images, questions, and facial expressions. Each facial image corresponds to one or more questions. Each question corresponds to one facial expression. The method includes the following steps. Obtaining images captured with an electronic device when the electronic device attempts to login to the server. Determining whether the image comprises a human face matching one stored facial image. If yes, determining one or more questions corresponding to one facial image according to the relationship. Outputting the determined questions and then obtaining user images captured by the electronic device. Identifying the human face and a facial expression of the identified human face. Determining whether the identified facial expression matches the facial expression corresponding to the output question. If yes, determining that the identity authentication is successful.

6 Claims, 2 Drawing Sheets

SERVER CAPABLE OF AUTHENTICATING IDENTITY AND IDENTITY AUTHENTICATION METHOD THEREOF

BACKGROUND

1. Technical Field

The present disclosure relates to servers, and particularly to a server capable of authenticating identity and an identity authentication method adapted for the server.

2. Description of Related Art

Many users have online accounts for various web-based services. These online accounts may be for email services, purchasing products, and social networking services. The web based service has various authentication mechanisms to verify the user identity. One common authentication mechanism is to determine whether the user inputs a correct user identification and password which are preset by the user. If the input user identification and password are both correct, the identity authentication is successful and then the user is allowed to access the web based service. However, such authentication mechanisms lack interest. Furthermore, in order to improve the password security, the user may preset a complex password including uppercase and lowercase letters and numbers, which makes it cumbersome and time consuming for the user to input the password.

Therefore, what is needed is a means to solve the problem described above.

BRIEF DESCRIPTION OF THE DRAWINGS

Many aspects of the present disclosure should be better understood with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

Figure 1:
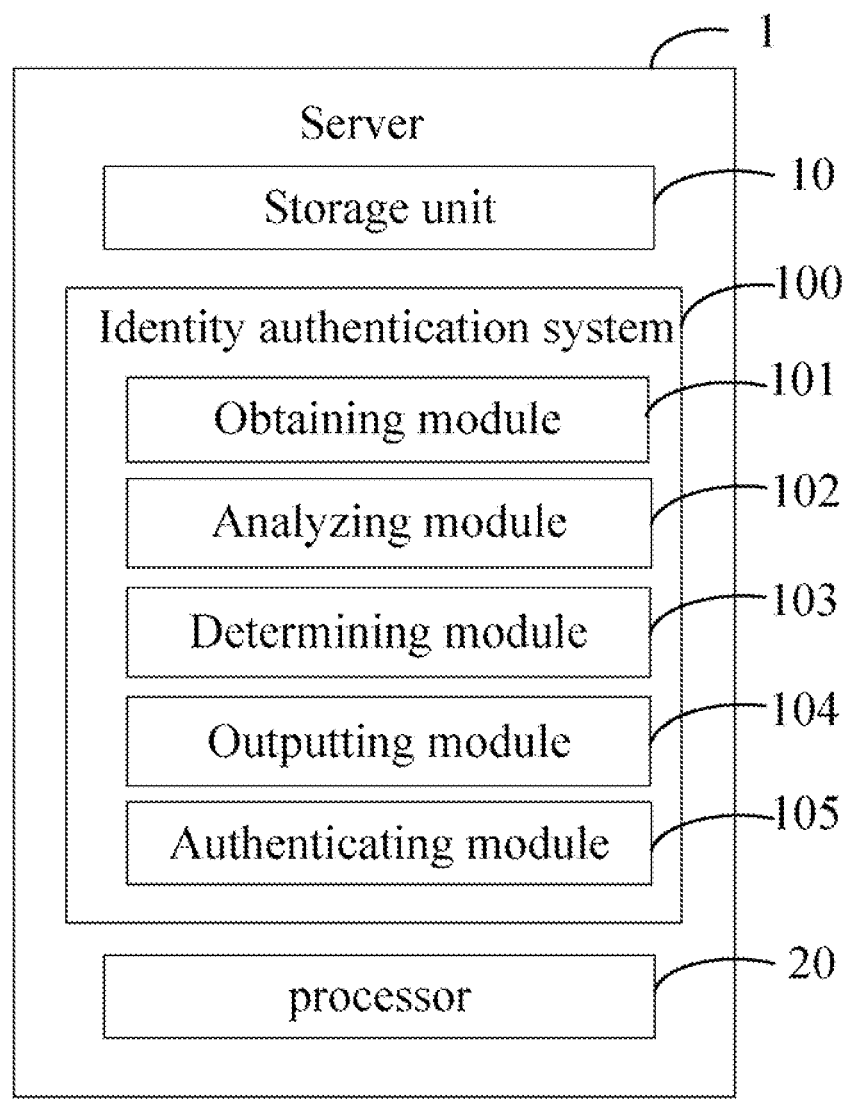
FIG. 1 is a block diagram of a server capable of authenticating identity, in accordance with an exemplary embodiment.

FIG. 1 is a block diagram of a server 1 according to an exemplary embodiment. The server 1 provides online services for authenticated users, such as email services, purchasing products, and social networking services. The server 1 includes a storage unit 10 and a processor 20. The storage unit 10 stores a relationship among a number of facial images of authenticated users, a number of questions, and a number of facial expressions. Each facial image corresponds to one or more questions set by the authentication user, and each question corresponds to one facial expression made by the authentication user. Specifically, the facial expressions may be closing the eyes, curling the lip, and frowning. The storage unit 10 further stores an identity authentication system 100. The system 100 includes a variety of modules executed by the processor 20 to provide the functions of the system 100. A detailed description of the variety of modules will be described as follows.

In the embodiment, the system 100 includes an obtaining module 101, an analyzing module 102, a determining module 103, an outputting module 104, and an authenticating module 105.

The obtaining module 101 obtains images captured by a camera of an electronic device (not shown, such as a mobile phone or a tablet computer) when the electronic device attempts to login to the server 1. In the embodiment, the obtaining module 101 periodically obtains images captured by the camera.

The analyzing module 102 determines whether the captured image includes a human face, if yes, a user is presented in front of the electronic device. The analyzing module 102 further determines whether the human face matches one stored facial image when the captured image includes a human face. Such a face determination method is known in the art, such as the subject matter of US Patent Application Publication No. 2012/0249524, which is herein incorporated by reference.

If the human face included in the captured image matches one stored facial image, the determining module 103 determines the one or more questions corresponding to the one facial image according to the relationship.

The outputting module 104 outputs the one or more determined questions to the electronic device. If there are two or more determined questions, the outputting module outputs the two or more determined questions to the electronic device one by one. When one question is output, the user makes a particular facial expression.

The obtaining module 101 further obtains user images captured by the camera after one question is output.

The analyzing module 102 further identifies the human face included in the obtained user image, identifies the facial expression of the identified human face, and determines whether the identified facial expression matches the facial expression corresponding to the output question. In this embodiment, if there are two or more determined questions, when one determined question is output to the electronic device and a correct facial expression is made, the outputting module 104 outputs the next determined question.

The authenticating module 105 determines that the identity authentication is successful each time when one question is output, and a facial expression matching the stored facial expression corresponding to the output question is determined, thereby allowing the user to login to the server 1. With the above configuration, the user has no need to input user identification and password. After one question is output, the user only needs to make a facial expression. If the facial expression is correct, the user can login to the server 1.

In an alternative embodiment, the storage unit 10 may further store a number of facial features, and each question further corresponds to one facial feature. Specifically, the facial features can be the features of the human face such as contour profile, color of skin, and wrinkle. In this case, the analyzing module 102 further identifies the facial feature of the identified human face, and determines whether the identified facial feature matches the facial feature corresponding to the output question. The authenticating module 105 determines that the identity authentication is successful each time when one question is output, a facial expression matching the stored facial expression corresponding to the output question is determined, and a facial feature matching the stored facial feature corresponding to the output question is determined.

In yet anther embodiment, the analyzing module 102 only identifies the facial feature of the identified human face, and determines whether the identified facial feature matches the facial feature corresponding to the output question. The authenticating module 105 determines that the identity authentication is successful each time when one question is output, and a facial feature matching the stored facial feature corresponding to the output question is determined.

Figure 2:
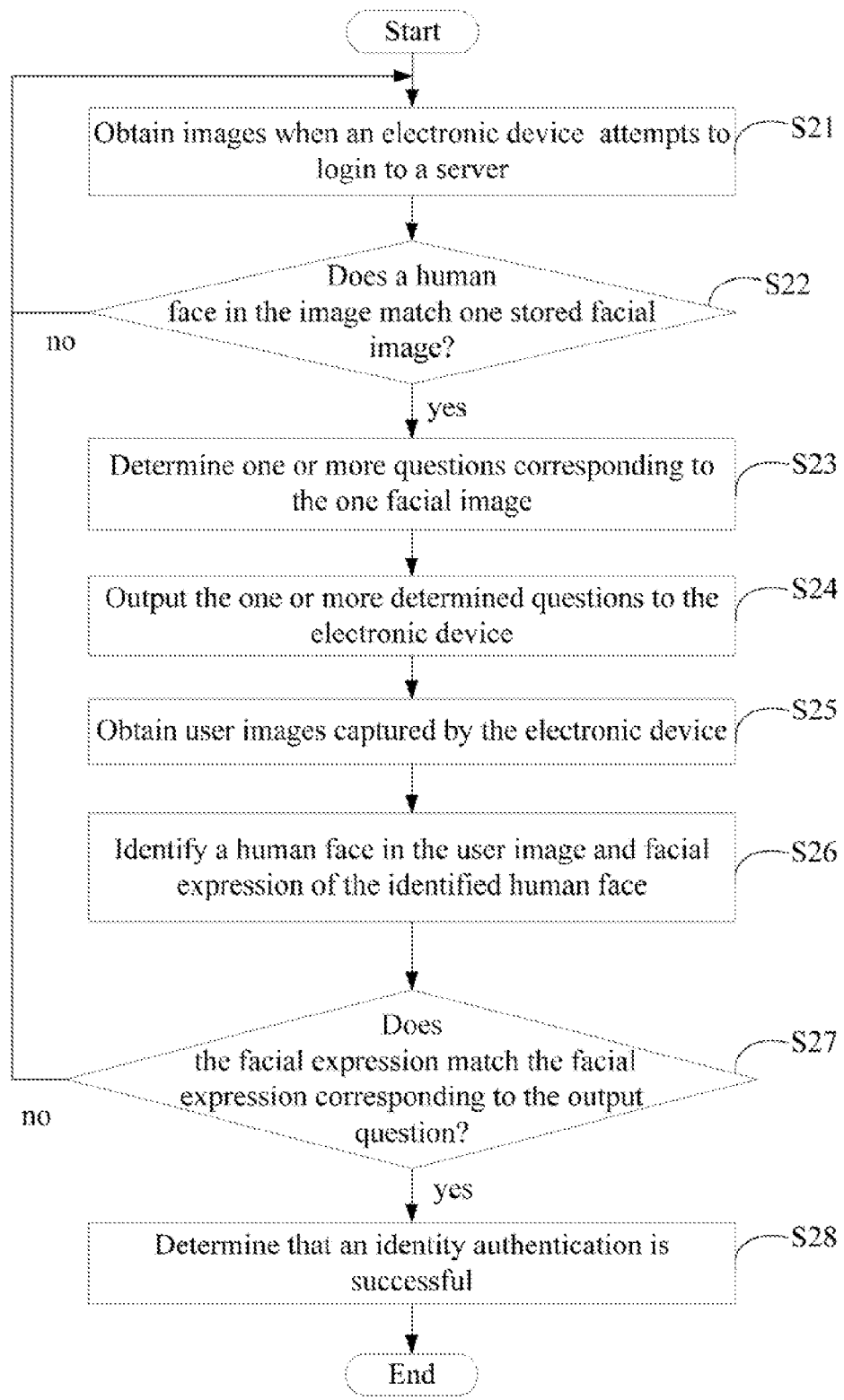
FIG. 2 is a flowchart of an identity authentication method, in accordance with an exemplary embodiment.

FIG. 2 is a flowchart of an identity authentication method, in accordance with an exemplary embodiment.

In step S21, the obtaining module 101 obtains images captured by a camera of an electronic device when the electronic device attempts to login to the server 1.

In step S22, the analyzing module 102 determines whether the captured image includes a human face, and determines whether the human face matches one stored facial image, if yes, the procedure goes to step S23; otherwise, the procedure goes back to step S21.

In step S23, the determining module 103 determines the one or more questions corresponding to the one facial image according to the relationship.

In step S24, the outputting module 104 outputs the one or more determined questions to the electronic device.

In step S25, the obtaining module 101 obtains user images captured by the camera after one question is output to the electronic device.

In step S26, the analyzing module 102 identifies the human face included in the obtained user image, and identifies facial expression of the identified human face.

In step S27, the analyzing module 102 determines whether the identified facial expression matches the facial expression corresponding to the output question, if yes, the procedure goes to step S28; otherwise, the procedure goes back to step S22.

In step S28, the authenticating module 105 determines that the identity authentication is successful, thereby allowing the user to login to the server 1.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A server comprising:
    a storage unit storing a plurality of modules, and a relationship among a plurality of facial images of authenticated users, a plurality of questions, and a plurality of facial expressions, each facial image corresponding to one or more questions set by the authentication user, and each question corresponding to one facial expression made by the authentication user at a client device; and
    a processor to execute the plurality of modules,
    wherein the plurality of modules comprises:
        an obtaining module to obtain images captured by a camera of an electronic device when the electronic device attempts to login to the server;
        an analyzing module to determine whether the captured image comprises a human face, and whether the human face matches one stored facial image;
        a determining module to determine one or more questions corresponding to one facial image according to the relationship if the human face comprised in the captured image matches the one stored facial image;
        an outputting module to output the one or more determined questions to the electronic device; and
        an authenticating module;
        the obtaining module further to obtain user images captured by the camera after one question is output;
        the analyzing module further to identify the human face comprised in the obtained user image, identify a facial expression of the identified human face, and determine whether the identified facial expression matches the facial expression corresponding to the output question;
        the authenticating module to determine that the identity authentication is successful each time when one question is output, and a facial expression matching the stored facial expression corresponding to the output question is determined, thereby login the user to the server.

2. The server of claim 1, wherein the obtaining module is configured to periodically obtains images captured by the camera.

3. The server of claim 1, wherein if there are two or more determined questions, the outputting module outputs the two or more determined questions to the electronic device one by one.

4. The server of claim 3, wherein if there are two or more determined questions, the outputting module outputs a next determined question to the electronic device when one determined question is output and a correct facial expression is made.

5. An identity authentication method applied in a server, the server comprising a storage unit storing a relationship among a plurality of facial images of authenticated users, a plurality of questions, and a plurality of facial expressions, each facial image corresponding to one or more questions set by the authentication user, and each question corresponding to one facial expression made by the authentication user, the method comprising:
    obtaining images captured by a camera of an electronic device when the electronic device attempts to login to the server;
    determining whether the captured image comprises a human face, and whether the human face matches one stored facial image;
    determining one or more questions corresponding to one facial image according to the relationship if the human face comprised in the captured image matches the one stored facial image;
    outputting the one or more determined questions to the electronic device;
    obtaining user images captured by the camera after one question is output;
    identifying the human face comprised in the obtained user image;
    identifying a facial expression of the identified human face;
    determining whether the identified facial expression matches the facial expression corresponding to the output question; and
    determining that the identity authentication is successful each time when one question is output, and a facial expression matching the stored facial expression corresponding to the output question is determined, thereby login the user at a client device to the server.

6. The identity authentication method of claim 5, wherein the step outputting the one or more determined questions to the electronic device further comprises:
    if there are two or more determined questions, outputting a next determined question to the electronic device when one determined question is output and a correct facial expression is made.

* * * * *